C. L. HOFF.
GRIP TREAD FOR ELASTIC TIRES.
APPLICATION FILED JUNE 15, 1910.
1,035,586. Patented Aug. 13, 1912.
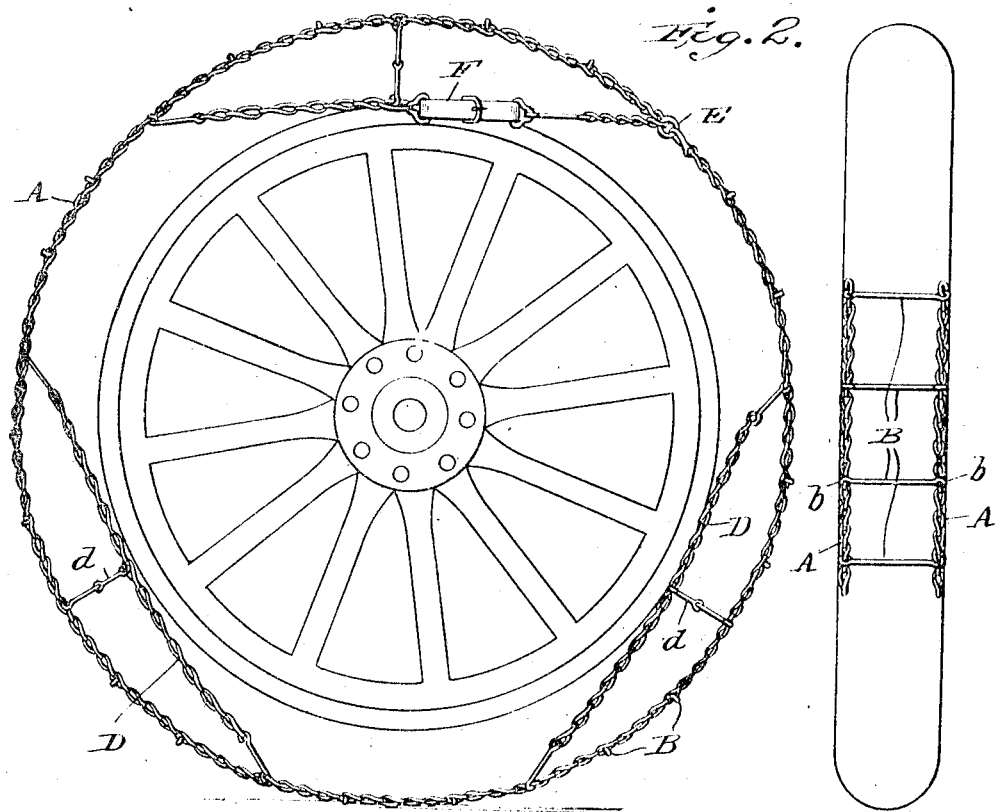
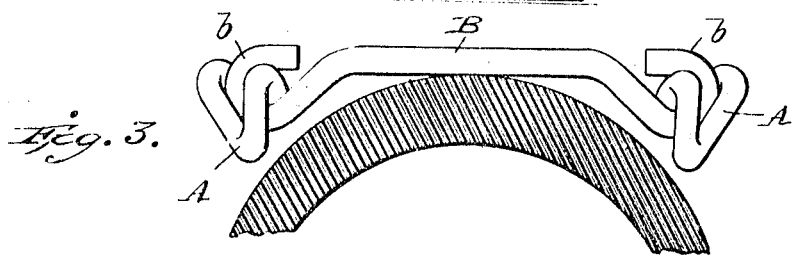
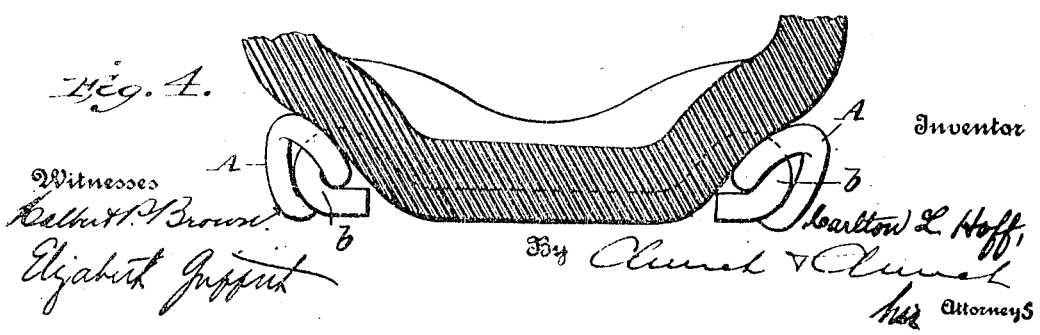

UNITED STATES PATENT OFFICE.

CARLTON L. HOFF, OF YORK, PENNSYLVANIA.

GRIP-TREAD FOR ELASTIC TIRES.

1,035,586.  Specification of Letters Patent.  Patented Aug. 13, 1912.

Application filed June 15, 1910. Serial No. 567,085.

*To all whom it may concern:*

Be it known that I, CARLTON L. HOFF, a citizen of the United States, residing at York, in the county of York and State of Pennsylvania, have invented a certain new and useful Improvement in Grip-Treads for Elastic Tires; and I do hereby declare the following to be a full, clear, and exact description of the same, reference being had to the accompanying drawings, forming a part of this specification, and to the figures and letters of reference marked thereon.

This invention relates to certain improvements in grip treads for tires, the invention being more especially applicable to structures designed for use in connection with inflated tires or tires having an elastic tread surface substantially convex in cross-section.

Objects of the invention are to provide a grip tread of the readily detachable type but having practically continuous gripping members extending around the wheel on each side of the center or plane of greatest diameter of the wheel and to prevent lateral displacement of such gripping members by transverse connections, preferably of such character as will subject the center portion of the tire tread to the least possible wear, suitable means being provided to retain the grip members on the wheel.

Other objects of the invention are to provide a convenient and simple means for putting the grip members under the desired tension and for securing them in position.

In the accompanying drawings—Figure 1 is a side elevation of a wheel equipped with a grip tread embodying the present invention. Fig. 2 is an elevation from a point of view in the plane of the wheel. Fig. 3 is a section through the top of a tire equipped with a grip embodying the present improvements. Fig. 4 is a section through the bottom of a loaded tire equipped with a grip tread embodying the present improvements.

Similar letters of reference in the several figures indicate the same parts.

The grip tread of the present invention embodies parallel grip members, preferably twisted chains A, spaced apart a distance which will cause them to occupy positions at opposite edges of the tread surface of the tire and in position to contact with the surface of the roadway between the edges of the tread surface of the tire and roadway. The longitudinally extending grip members or chains are held in proper spaced position with relation to each other and to the tire by cross-connections which are preferably relatively insignificant as grip members and are conveniently in the form of long links B round in cross-section to avoid wear on the tire and having eyes $b$ at the ends which engage the proximate bars of the respective chains. The length of the links should be such that the chains will be positioned as before indicated on opposite sides of the effective tread surface of the tire but still sufficiently near the center to lie under the edges of the tread surface when said surface is in contact with the roadway and slightly flattened by contact with the roadway.

The position of the grip members will be best appreciated by an inspection of Figs. 3 and 4 in which it will be seen that the grip members are in the best position to prevent any side slip or skidding of the wheel and are also in effective position to increase the traction of the wheel. They form in effect continuous gripping surfaces between the tire tread surface and roadway which will effectually prevent a skid from commencing, thus overcoming one of the chief defects in the type of tread grip employing transverse gripping members between which relatively long tire surfaces contact with the roadway with no grip member in effective position to prevent the skid from starting. Any suitable means may be employed to prevent the escape of the grip members from the wheel such, for instance, as short sectional side chains D and jointed links $d$. One of these sectional side chains may conveniently be employed as the means for taking up or tensioning the grip members. For this purpose one end of each grip member is provided with a ring E through which the opposite end is passed and drawn back by an adjusting or take-up device, such as the strap F forming a part of the sectional side chain.

The transverse connecting members B may be conveniently made to conform to the transverse contour of the tire where it contacts with the roadway and as this will elevate the central part of the connecting members above the plane of the chains or grip members the whole device will be firmly retained even without the employment of side chains but the latter are desirable to give an increased factor of safety in resisting excessive strains.

Where the longitudinal grip members are formed of twisted chain, as shown, it is desirable that the connecting links or members should engage the chain links at the higher points so that the eyes of the connecting members are not pressed into the tire and for this reason the chains should be of right and left twist respectively and the grip should be applied to the wheel in such manner that the traction tends to move the connecting members to the higher ends of the side bars of the links as will be readily understood.

It is desirable with a grip of the construction set forth to have the grip members fit tightly about the tire so as to prevent as far as practicable lateral play, or movement, thus there will be little creeping of the grip and the chains will pass down under the edges of the tire tread surface in effective position to prevent skidding but without subjecting the center of the tire tread to appreciable increased wear. In other words, the wear on the tire from use of the grip members occurs on those portions of the tire least subject to wear in the normal use of the tire and has the effect of distributing the wear over a larger area.

Having thus described my invention, what I claim as new and desire to secure by Letters Patent of the United States is—

1. A removable tread grip embodying parallel independently flexible chains spaced apart with a clear space for the admission of the tread of the tire between them, and substantially rigid transverse connections loosely connected at opposite ends with the chains to hold the chains at opposite edges of the tread surface of the tire in position to be constantly pinched between the sides of the tire and roadway, whereby the inauguration of any skidding action is prevented at all points around the circumference of the tire and the wear between the chains and tire is confined to portions of the tread subjected to the least wear by contact with the roadway, said grip embodying means whereby it is removably held in position.

2. A tread grip embodying continuous parallel chain grip members having a space between them through which the tread surface of the tire projects into contact with the ground and occupying positions at opposite edges of the tread surface whereby the edges of the tire tread surface are supported by the grip members rigid transverse links jointed to the chains for holding them in spaced relation, a ring on one end of each grip member and through which the opposite end of the member passes, side chains connected at each end and at a point intermediate the ends with the grip for holding the grip in position on the wheel one of said side chains being connected at one end to the end of the grip member passing through the ring, and an adjusting means forming part of said last mentioned side chain.

3. A tread grip embodying parallel chain grip members having a space between them through which the tread surface of the tire projects into contact with the ground whereby the edges of the tire tread surface are supported by the grip members, the links of said grip members being twisted to the right and left respectively, rigid links for holding the grip members in spaced relation, said links having eyes engaging the higher side of opposite links of the grip members whereby the eyes of the links will be supported away from the tire, means for adjusting the length of the grip members, and means for holding the grip in place embodying sectional side chains.

CARLTON L. HOFF.

Witnesses:
E. Philip Stair,
Andrew J. Hershey.